March 25, 1969  H. V. DE GREEVE ET AL  3,434,906
PLASTIC DISPENSING CONTAINER AND METHOD OF MAKING SAME
Filed June 20, 1966

INVENTORS
Harry V. de Greeve
James B. Ragan
BY

March 25, 1969 H. V. DE GREEVE ET AL 3,434,906
PLASTIC DISPENSING CONTAINER AND METHOD OF MAKING SAME
Filed June 20, 1966 Sheet 2 of 2
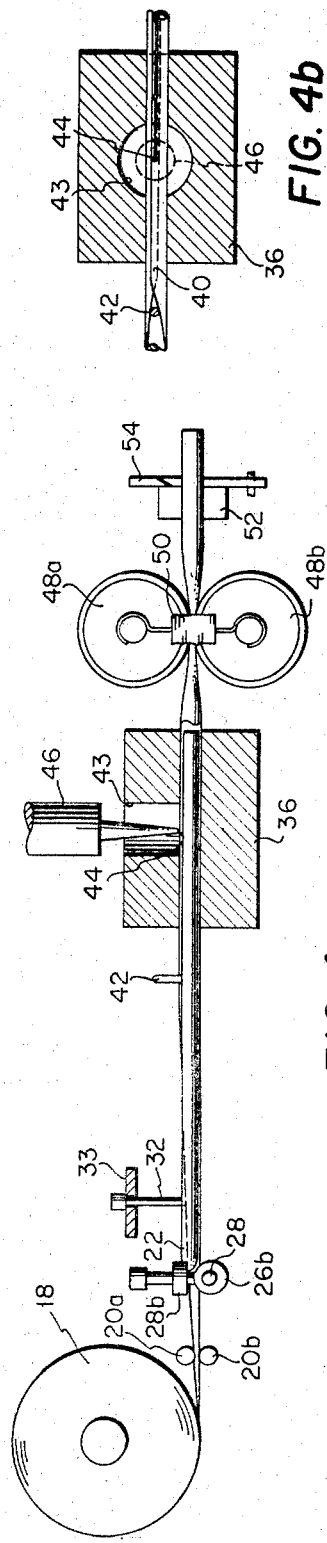
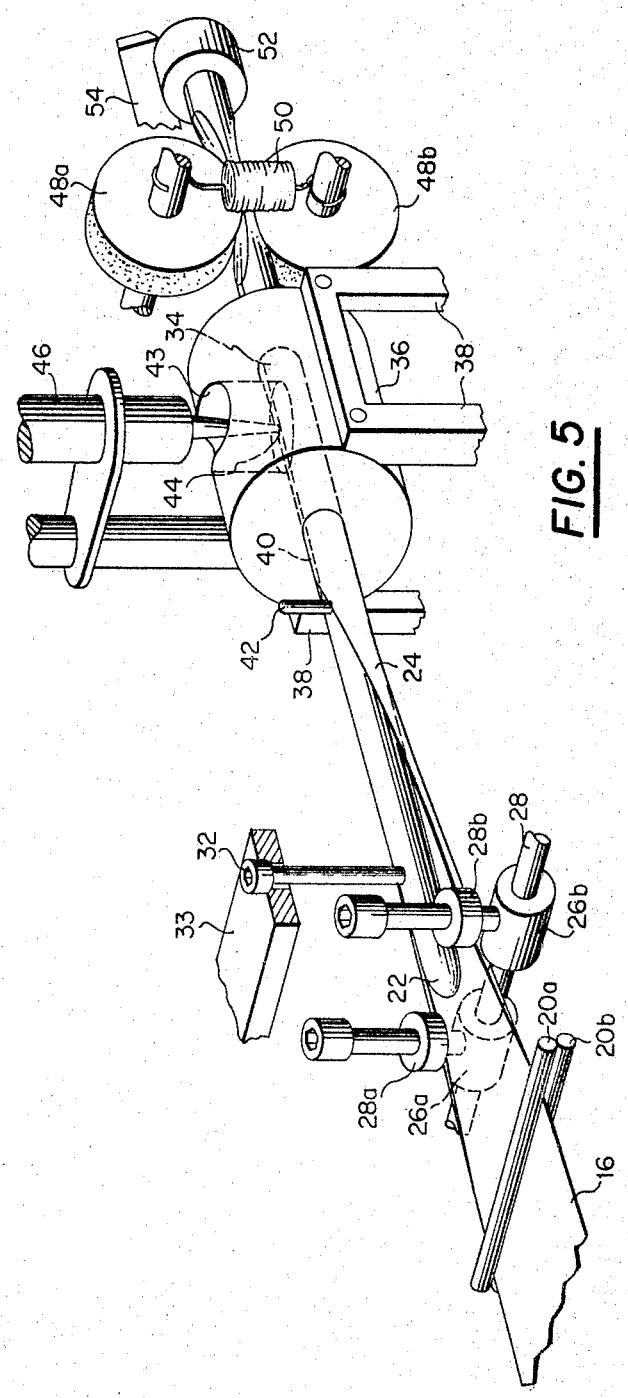

United States Patent Office 3,434,906
Patented Mar. 25, 1969

3,434,906
PLASTIC DISPENSING CONTAINER AND METHOD
OF MAKING SAME
Harry V. de Greeve, San Anselmo, and James B. Ragan, San Rafael, Calif., assignors to Ways & Means, Inc., Sausalito, Calif., a corporation of California
Filed June 20, 1966, Ser. No. 558,964
Int. Cl. B29d 23/10
U.S. Cl. 156—466     4 Claims

ABSTRACT OF THE DISCLOSURE

An apparatus for producing a tubular container of plastic sheet material which comprises a tubular folding die with an opening in its wall, a mandrel having a free front end and extending with its rear end into said die coaxially therewith, an ultrasonic vibrator mounted with its sealing nose extending through the opening in said die into close proximity to the exposed surface of the mandrel portion within said die, and means for pulling a band of plastic material along and over said mandrel and through the space between the inner surface of said die and the rear end of said mandrel. Guide means are provided adjacent the free front end of said mandrel at either side thereof for initiating the folding movement of the edge areas of the band of plastic material as it is pulled along the front end of said mandrel. To control this initial phase of the folding operation as effected by said guide means, limit stop means for the longitudinal edges of the band are arranged above said guide means, and a centering pin is mounted upon the mandrel in front of the folding die.

---

The present invention relates to the containers of plastic material that are used widely in the pharmaceutical industry and which are employed to hold and dispense predetermined dosages of liquid or semi-liquid substances. A desirable embodiment of containers of this type comprise a tubular enclosure having a closed and an open end; and provided in said enclosure near the open end thereof is a diaphragm or partition that can be ruptured by manual pressure applied to its edge through the deformable wall of the enclosure. Dispensing containers can be used but once, and cost is a main consideration. For reasons of cost it would therefore be desirable to construct both the wall of the enclosure and the diaphragm from the same material in a single molding operation rather than go to more complex operation of fitting a diaphragm of brittle material into an enclosure of a more flexible substance. Certain plastic materials, such as polyethylene, appear to provide a solution for this problem. By molding the described article from polyethylene in such a manner that the enclosure wall and the diaphragm are of predetermined thickness, it is posible to crush the diaphragm dependably the first time pressure is applied to its edge through the wall of the container. Unfortunately, polyethylene and other plastic materials that are capable of providing the described performance, have a serious defect when used to contain liquid or semi-liquid substances. They are of such molecular structure that certain liquid or semi-liquid substances will evaporate through them in time; in other words, they are incapable of preserving predetermined dosages of liquid or semi-liquid substances for prolonged period of time—which is a most serious defect for many of their intended uses.

It is an object of the invention to provide a dispensing container, of the type referred to, that is capable of containing liquid or semi-liquid materials in a hermetically sealed condition without noticeable loss for extended periods of time, and which is yet inexpensive and easy to manufacture in large quantities.

In accordance with the invention the dispensing container is made from two portions, a smaller molded one which contains the frangible diaphragm and a larger one which constitutes the liquid containing compartment of the container and which is made of an impervious material. The difficulty in constructing such a composite container resides in the complexity and cost of the operation by which the two parts are joined together. The most inexpensive method of joining plastic materials is the heat sealing process, i.e. the components are heated and pressed against each other at moderate presures. In the present instant, however, the application of the heat sealing method appeared to be impossible because only plastic materials of related chemical composition lend themselves readily to juncture by heat-sealing.

In accordance with the invention the main body of the tubular container, i.e. the part that is to contain the liquid, is constructed from so-called laminated plastic materials, i.e materials composed of several superposed and bonded layers or plies of different materials, and the laminated material employed in accordance with the invention contains at least one middle ply or layer that provides the necessary degree of impermeability, while its outer plies are of the same material as the diaphragm-carrying molded end portion of the container. Hence, the body portion or compartment of laminated plastic material is capable of both, the required retention of its liquid contents and of juncture, by heat-sealing, to the container portion which carries the brittle diaphragm and which is made by a simple molding process from relatively permeable materials, such as polyethylene.

Unfortunately, the use of laminated materials in the construction of dispensing containers of the type here under consideration raises again the question of cost. The most inexpensive way of producing tubular containers from plastic materials is by extruding long tubes through extrusion nipples and cutting these tubes into sections of the required length. The extrusion process, however, does not lend itself readily to the manufacture of tubes from laminated plastic materials.

It is, therefore, another object of the invention to provide a method of, and an apparatus for, producing plastic tubes in a simple and inexpensive manner from laminated plastic sheets.

Still another object of the invention is to provide a method of, and an apparatus for, joining two tubular articles with each other in a dependable, yet simple and inexpensive manner that lends itself to mass production methods.

These and other objects of the invention will be apparent from the following description of the accompanying drawings which illustrate a preferred embodiment thereof and wherein FIGURE 1 is an enlarged elevation, partly in section, of a dispensing container constructed in accordance with my invention;

FIGURE 4A is a somewhat schematic side elevation of an apparatus for making the liquid-enclosing compartment or body portion of the container shown in FIGURE 1;

FIGURE 4B is a horizontal section through the folding die which forms part of the apparatus shown in FIGURE 4A;

FIGURE 5 is a fragmentary perspective of the apparatus shown in FIGURES 4A and 4B;

In accordance with the invention we fold a band or tape of a laminated plastic material having its outer plies made from the same material, in a continuous process over a mandrel to such an extent that its longitudinal margins or edge areas overlap and we seal the overlapped edge areas by the application of ultrasonic vibrations to produce a tube of ever-increasing length. This tube is cut into sections of appropriate length to form the blanks for the liquid-containing compartment of the dispensing containers; we produce the diaphragm-containing part of the container by a simple molding operation from the same material as the outer plies of the tube of laminated material, whereupon both the component parts of the container are telescoped and their overlapped portions are rolled under pressure against and along a ridge-shaped heating element to heat-join them permanently.

The container constructed according to the invention is inexpensive and easy to manufacture by mass production methods. If its molded portion and the outer plies of the tube are made from a material, such as polyethylene, it provides a diaphragm closure that may readily be ruptured the first time pressure is brought to bear against its edge by the thumb and forefinger of the user through the flexible walls of the container, and yet its liquid contents are hermetically enclosed in a manner that holds evaporation at an insignificant minimum.

Figure 1:
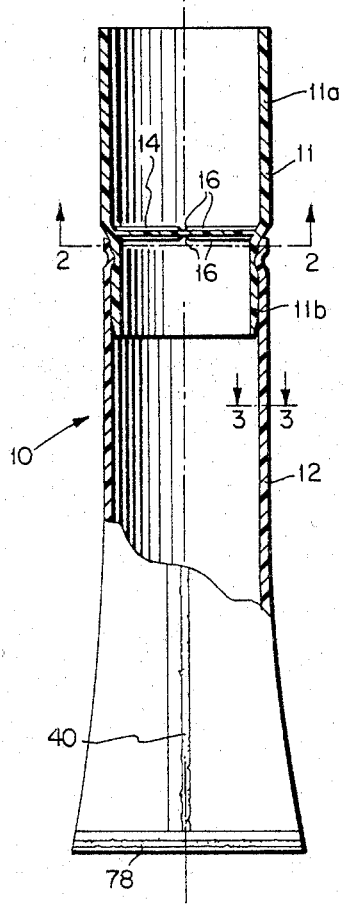
Figure 2:
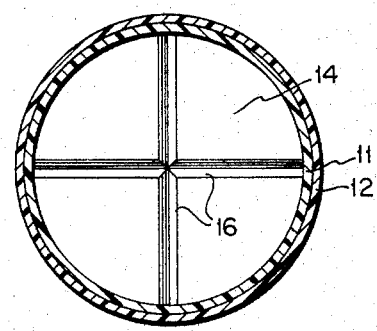
FIGURE 2 is a cross section through the container shown in FIGURE 1, taken along line 2—2 thereof and viewed in the direction of the arrows associated with said line.

Having now reference to FIGURES 1 and 2, the container 10 of the invention comprises a smaller end portion 11 and a larger body portion 12. The smaller portion 11 is essentially a short tube whose interior is divided into two compartments by a thin imperforate partition or diaphragm 14. One or both of the surfaces of said diaphragm may contain a number of diagonal grooves or score lines 16 of wedge-shaped cross section. In the preferred embodiment of the invention illustrated in the accompanying drawings the tube sections 11a and 11b at either side of the diaphragm 14 are of slightly different diameter. The whole end portion 11 including the diaphragm 14 may be molded in one piece in a single molding operation, and when molded from the proper plastic material, such as polyethylene, the diaphragm may readily be crushed by pressure applied to opposite points of its periphery through the deformable wall of the tube 11, without injuring the tube wall itself.

Figure 3:
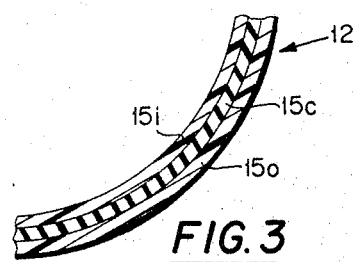
FIGURE 3 is an enlarged cross section taken along line 3—3 of FIGURE 1.

The compartment or body portion 12 of the container 10 is a tube of an internal diameter of a size to fit snugly over the small diameter section 11b of the molded component 11. It is made of laminated plastic material whose innermost and outermost plies $15_i$ and $15_o$ are made from the same class of material as the molded end portion 11; i.e., a plastic material of substantially the same melting point. This laminated material contains at least one middle ply $15_c$ that is impervious to liquids, such as polyester or metal foil (FIGURE 3).

The apparatus for forming a tube of laminated plastic material in a simple and inexpensive manner is illustrated in FIGURES 4A, 4B and 5. A band 16 of the laminated material is taken from a rotatably mounted supply reel 18, passed between two superposed idler rolers $20_a$ and $20_b$ and guided underneath the rounded front end 22 of a mandrel 24. Said rounded front end of the mandrel 24 is flanked by two drums $26_a$ and $26_b$ whose inner end faces engage the longitudinal margins or edge areas of the band 16 and act as guides which commence to fold said edge areas over the mandrel. In the embodiment of the tube-forming apparatus illustrated in FIGURES 4A and 5 the guide drums $26_a$ and $26_b$ are mounted upon a common shaft 28 that extends transversely in front and below the rounded front end 22 of the mandrel, and arranged above each of said guide drums are disc-shaped limit stops $28_a$ and $28_b$ which are engaged by the upwardly turning longitudinal edges of the band 16. In this manner the stops $28_a$ and $28_b$ limit upward movement of said edges at either side of the front end of the mandrel so that the initial folding operation may occur symmetrically. The mandrel is held in position by a rod 32 that rises from the summit of its front end 22, and the upper end of said rod is suitably supported from the machine frame which is schematically indicated at 33. The cylindrical rear portion 34 of the mandrel extends into the cylindrical passage of a tubular folding die 36 that is supported by uprights 38. As the partially folded band is pulled into the folding die and through the annular space between the mandrel and the die, it is folded completely over the mandrel 24 to such an extent that its longitudinal edge areas overlap to a limited degree, as indicated at 40 (FIGURE 4B). An upwardly projecting guide pin 42 may be provided on the summit of the mandrel 24 a limited distance in front of the entrance to the die 36 as an added means to insure symmetrical progress of the folding operation. A window 43 is provided in the top segment of the tubular die 36 to expose a length of the overlapped edge areas 40 of the completely folded tape as it is pulled through the die; and arranged to protrude into said window and bear upon the overlapped margins of the folded tape is the nose 44 of an ultrasonic vibrator 46 which is suitably supported from above the die 36 in a manner permitting vertical adjustment. When the nose of the vibrator is pressed against the overlapped edge areas 40 of the completely folded tape upon mandrel 24 with a controlled force, and the vibrations generated by said vibrator are transmitted to the upper one of the edge areas, heat is instantaneously generated along the joint causing the plastic material at the interface to melt; and since the confronted plies of the overlapped edge areas are both of the same material, the joint fuses and is permanently sealed. Hence, as the tape is pulled through and from the die 36, it is permanently converted into a tube having a longitudinal seam (FIGURE 1).

Behind the die 36 the newly formed tube is gripped by and between the peripheral surfaces of two discs or wheels $48_a$ and $48_b$ which are yieldably urged against each other with a controlled force by suitable spring means diagrammatically indicated at 50, and at least one of which is power driven in any suitable manner to pull the band from the supply reel and through the described sequence of processing stations. Said drive discs $48_a$ and $48_b$ may be arranged to deliver the newly formed tubing into a cut-off die 52 beyond which an intermittently operating chopper 54 acts under control of a tube length sensing arm to cut said tubing into sections of desired length.

The tubing produced in the manner described hereinbefore may be so dimensioned that it fits over the small diameter section $11_a$ of the above described diaphragm-carrying end portion 11 as has been pointed out hereinbefore, and to complete the container illustrated in FIGURE 1, a section of appropriate length of said tubing is slipped over the small diameter section $11_b$ of said molded end portion and is permanently secured to it. If the internally located outer ply $15_i$ of the laminated sheet material from which the tubing is made, is of the same material as the molded body 11, as it is in the examplary embodiment of the tube-forming process described above, the preferred method of joining the tube section 12 to the molded body 11 is by heat sealing. This can be effected efficiently and cheaply and lends itself to mass production methods.

Figure 6:
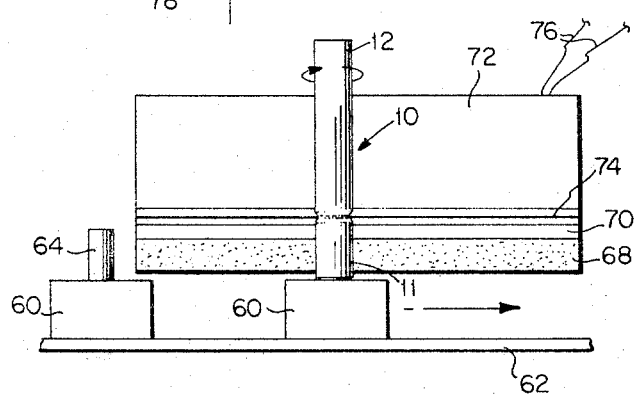
FIGURE 6 is a side elevation of an apparatus for joining the tubular body portion of the container to the molded end portion which carries the frangible diaphragm.
Figure 7:
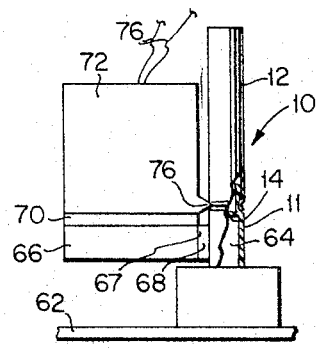
FIGURE 7 is an end view of the apparatus shown in FIGURE 6.

FIGURES 6 and 7 illustrate apparatus for heat sealing the tube sections 12 to the molded end portions 11. The reference numeral 60 identifies a block or pedestal on an endless conveyor belt indicated schematically at 62, which carries an endless procession of such blocks 60. Each pedestal 60 is provided with a vertically disposed mandrel 64 of an external diameter of a size to fit smoothly into the large diameter section 11$_b$ of the end portion 11 and hold said portion in position. A piece of tubing 12 of the proper length is telescoped from above over the small diameter section 11$_a$ of the molded portion 11, as illustrated in both FIGURES 6 and 7.

Suitably supported adjacent the horizontal upper run of conveyor belt 62 at the level of the mandrels 64 upon the blocks 60 is a mounting plate 66. Said plate carries upon its edge 67 adjacent the path of advance of said mandrels a lining 68 of a suitable friction material and the outer surface of said lining is disposed so close to the path of advance of the mandrels 64 that when the molded end pieces 11 are placed upon said mandrels, they bear against and are engaged by said lining 68. Hence, when the end pieces 11 travel along said lining upon the conveyor belt 62, contact with the friction material 68 imparts to them a rotational moment which is effective to turn them upon and about said mandrels. Secured to the upper surface of the mounting plate 66 is a layer of heat insulating material 70, such as an asbestos compound, and supported upon said layer 70 is an elongated block 72 of a heat-conducting material, such as aluminum, brass or bronze. The lower edge of said block 72 adjacent the horizontal conveyor run 62 forms a rib or ridge 74 that projects into the path of advance of the telescoped ends of the portions 11 and 12 upon the mandrels 64 at a level above the plane defined by the diaphragm 14 in the molded end portions 11 (FIGURE 7). Means represented by the lead wires 76 are provided to heat the block 72 and its ridge 74 to the temperature required to soften the plastic material from which the molded pieces 11 and the internally located plies 15$_i$ of the tube sections 12 are made, to the degree necessary for sealing one to the other under the pressure exerted upon the telescoped portions by the rib or ridge 74. Hence, as the molded pieces 11 with the tube sections 12 engaged thereover advance upon the conveyor 62, with the outer surfaces of the tube portions 12 engaged by the heated rib 74, and are continually turned about the mandrels 64 by contact of the outer surface of the tube portions 11 with the friction lining 68, an all-embracing circumferential seal is provided between the molded end pieces 11 and the tube sections 12 at a level slightly above the diaphragm 14 in the molded end portion 11, as viewed in FIGURE 7, or below said diaphragm as viewed in FIGURE 1.

It remains to fill the container with whatever liquid or semi-liquid it is to contain. This is accomplished through the open end of the tube section 12 whereupon said end is crimped and heat-sealed in a conventional manner, as indicated at 78 in FIGURE 1. The filled container is now ready for shipment, storage and use. Due to the nature of the material from which its liquid containing compartment 12 is made, it is capable of maintaining a predetermined dosage without noticeable loss for prolonged periods of time, and due to the nature of the material from which the diaphragm 14 is molded, pressure applied to the edge of the diaphrgam by the user's forefinger and thumb through the deformable wall of the container is sufficient to break the diaphragm and release the contents of the container dependably the first time such pressure is applied. In spite of its composite nature and the highly desirable features of providing easy frangibility of the diaphragm and a high degree of permanence in the retention of its liquid contents, the container of the invention is inexpensive and can readily be manufactured in large quantities.

While we have explained our invention with the aid of a preferred embodiment thereof it will be understood that the invention is not limited to the specific constructional details of the various apparatus shown and described by way of example nor to the specific type of container shown, which may be departed from without departing from the scope and spirit of the invention.

We claim:
1. An apparatus for producing a tube of plastic material comprising a tubular folding die having an opening in its wall, a mandrel having a front end and a rear end, said rear end extending into said die coaxially therewith, an ultrasonic vibrator having a sealing nose, means mounting said vibrator with said sealing nose thereof extending into said opening into close proximity to the exposed surface of said mandrel, means for pulling a band of plastic material along and over said mandrel and through the space between said sealing die and the rear end of said mandrel, and guide means arranged adjacent the front end of said mandrel at either side thereof for initiating the folding movement of the edge areas of said band of plastic material about said mandrel.

2. Apparatus according to claim 1 wherein the front end of said mandrel is rounded.

3. An apparatus according to claim 1 including limit stops for the longitudinal edges of said band associated with said guide means for controlling the initial folding movement of the edge areas of said band as effected by said guide means.

4. An apparatus according to claim 1 including a centering pin projecting from said mandrel in front of said folding die in longitudinal alignment with the center of said opening thereof.

References Cited

UNITED STATES PATENTS

| | | | |
|---|---|---|---|
| 2,741,296 | 4/1956 | Collins | 156—466 |
| 3,101,404 | 8/1963 | Hill | 156—73 |
| 3,222,239 | 12/1965 | Deans | 156—73 |
| 3,312,250 | 4/1967 | Sirignano et al. | 156—73 |
| 3,350,251 | 10/1967 | Davis | 156—466 |

DOUGLAS J. DRUMMOND, *Primary Examiner.*

U.S. Cl. X.R.

156—580; 222—94